Patented Dec. 27, 1949

2,492,498

UNITED STATES PATENT OFFICE 2,492,498

MANUFACTURE OF INORGANIC FIBROUS LAMINATE

William W. Pedersen, Cleveland Heights, Ohio, assignor to Dow Corning Corporation, Midland, Mich., a corporation of Michigan No Drawing. Application April 16, 1946, Serial No. 662,605

10 Claims. (Cl. 154—128)

1

The present invention relates to the manufacture of panel board for electrical uses, and particularly to improvements in the production of composite sheets of inorganic fibrous sheet material and siloxane resins useful as panel board.

A convenient method of manufacturing panel board of the type described would be to dip the sheet material in a solution of the siloxane resin, stack several sheets and cure the stack in a press. When this is attempted, one of two difficulties is generally encountered. Resin flows out of the stack, which may result in losses up to 75 to 80% of the resin, when the amount of resin solids present is around 50% of the total dry weight. Also the resin may spread at the edge of the laminated assembly, carrying along with it a portion of the fabric, so that the edges of the material are splayed out. This phenomenon occurs even with woven fabrics. In case it is attempted to avoid these noted defects by precuring the resin, difficulty is encountered in obtaining bonding of the sheets into a unitary panel during curing in the press.

An object of the present invention is the provision of improved methods for the production of composite sheets of inorganic fibrous sheet material and siloxane resin.

In accordance with a preferred form of the present invention an inorganic fibrous sheet material is impregnated with a siloxane resin solution which contains an ethanolamine. The impregnated sheet material is dried and partially cured. In this condition, the sheet material is laminated, molded in a heated press, wherein the resin is further cured. Curing of the molded sheet may then be completed either in the press or in an oven. It has been found that the ethanolamine causes a precure which avoids substantial loss of resin and prevents the sheet material from spreading at the edges, but which still permits bonding together of the sheets in the molding operation.

The siloxane resins employed can be cured in deep section. These resins are soluble in toluene and have a degree of substitution between about 0.5 and 1.4 organo groups per silicon atom. The organo groups referred to are linked to the silicon by carbon to silicon bonds, and the silicon atoms are linked by Si—O—Si structures. At least a portion, and preferably at least 25%, of the monoorganosiloxane units are alkyl-siloxane units in which the alkyl radicals contain less than five carbon atoms each. The remainder of the monoorganosiloxane may be phenyl or higher alkyl substituted. Partially condensed resins of the type here involved are obtainable by the hydrolysis of the corresponding chloride or ethoxy derivatives in water, preferably in the presence of a collecting solvent, such as toluene, in which the hydrolyzate is soluble. The solution of hydrolyzate in solvent may be refluxed and then washed to neutrality. Other suitable methods may be employed for the preparation of these partially condensed resins.

Suitable resins and their preparation are disclosed in greater detail in the copending applications of E. L. Warrick, Serial No. 567,901, filed December 12, 1944, now abandoned, and of Fenn and Rauner Serial Nos. 642,438; 642,439, and 642,440, (the last two now abandoned) all filed on January 21, 1946.

Resins of this type are generally best handled in solution, the customary organic solvents being suitable, such as ethyl alcohol, isopropyl alcohol, benzene, toluene and the like.

An ethanolamine is added to the partially condensed resin solution, generally in amount less than 5% by weight, based on the resin present. Mono-, di-, and triethanolamine have been found to operate satisfactorily in the present process.

The inorganic fibrous sheet material employed may be of any desired variety, as for instance woven, knitted or matted with the fibers randomly oriented parallel to the plane of the mat. It may be composed of inorganic fibrous material, such as glass or asbestos. A sufficient number of layers is employed to give a board of the desired thickness.

In production, the sheet material is impregnated with the siloxane, as by dipping, spraying, or the like. It is then dried to remove the solvent. The siloxane resin carried by the sheet is then partially cured, preferably between about 80° and 300° C. The partial cure of the resin prevents the resin from flowing out of the sheets when they are heated under pressure. The material containing the siloxane is laminated either before or after the partial curing, though the laminae do not adhere until the molding operation. Following precuring and laminating the material is molded in a hot press at a temperature above the precuring temperature. In this molding operation, the siloxane resin is further cured. This curing is carried to the point that the laminated sheet is substantially rigid and accordingly any shaping is effected in this molding operation. The curing effected in the molding may terminate the curing, or if desired the product may be further cured in an oven.

The following examples are illustrative of the method hereof, and should not be considered as definitive of the scope.

*Example 1*

A 60.4% solution of a siloxane resin in toluene was employed for the production of panel board. The resin contained 2.4 mol per cent of trimethyl siloxane units, 34 mol. per cent of phenyl siloxane units and 63.4 mol. per cent of methyl siloxane units. The degree of substitution of the resin was 1.048 organo groups per silicon atom. To 136 parts by weight of resin solution, there were added 0.82 part of a 10% solution of triethanolamine in toluene and an additional 33 parts of toluene to give a solution containing 48% solids. A glass fiber fabric was dipped in the solution and air dried for thirty minutes. The dried fabric was precured for 15 minutes at 140° C. Nine sheets of the glass fabric so treated were assembled into a laminated sheet. This was placed in a molding press which had flat platens and no retainer around the edges of the assembled sheet. The sheet was left in the press for one hour at 175° C. under 1000 pounds per square inch pressure. When the sheet was removed from the press there was no indication of resin having been lost from the sheet, nor had the edges of the sheet been spread out by flow of the resin under the pressure employed. The fabric sheets cohered to form a unitary laminated product. This product was then cured in an oven for 2 hours at 140° C., for 1 hour at 200° C. and for 1 hour at 250° C. In this procedure, 0.1% of triethanolamine was employed based on the siloxane resin. The triethanolamine has also been introduced as a 10% solution in isopropanol and as a solution containing 10% triethanolamine, 30% toluene and 60% isopropanol with equivalent results.

*Example 2*

Laminated sheets in strip form were prepared by coating glass fiber tape of half inch width with a 60.4% solution in toluene of the resin, described in Example 1, which solution contained 0.5% of an ethanolamine, as shown below. Sufficient resin was employed in each case to hide the cloth pattern in reflected light. The tapes were air dried and precured for 30 minutes at 150° C. Six tapes were assembled to produce each laminated strip. The assembly in each case was pressed cold and then placed in a flat plate press held at 250° C. for 30 minutes at 320 pounds per square inch. No spreading of the tapes occurred. With various ethanolamines, the per cent of the resin lost during the molding operation was as follows:

| | Percent |
|---|---|
| Triethanolamine | 4.3 |
| Diethanolamine | 0.58 |
| Monoethanolamine | 1.85 |

When the same procedure was followed with the exception that the ethanolamine was omitted, the resin loss was 54%.

I claim:

1. The method of making laminated material which comprises impregnating inorganic fibrous sheet material with a partially condensed siloxane resin and an ethanolamine in a liquid vehicle, drying the impregnated sheet material, partially curing the siloxane resin, laminating the sheet material so prepared, and further curing the laminated assembly under mechanical pressure whereby loss of resin from the sheet material is reduced.

2. The method of making laminated material which comprises impregnating inorganic fibrous sheet material with a partially condensed siloxane resin and an ethanolamine in a liquid vehicle, drying the impregnated sheet material, partially curing the siloxane resin, laminating a plurality of layers of sheet material so prepared, molding the laminated assembly under pressure at a temperature higher than during said partial curing to form a unitary structure, whereby substantial spreading of the edges of the sheet material is avoided.

3. The method in accordance with claim 2, in which the molded laminated assembly is subjected to further curing after the molding operation at a temperature at least as high as that during the molding operation.

4. The method in accordance with claim 2, in which the ethanolamine is present in amount less than 5% based on the partially condensed siloxane resin present.

5. The method of making laminated material which comprises impregnating glass fabric with a solution of a partially condensed siloxane resin and an ethanolamine in a volatile solvent, drying the fabric to remove the solvent therefrom, partially curing the siloxane resin, laminating a plurality of layers of fabric so prepared, molding the assembly so laminated under pressure at a temperature higher than the temperature during the partial cure, whereby substantial spreading of the edges of the glass fabric is avoided.

6. The method of making laminated sheet material which comprises impregnating glass fabric with a solution of a partially condensed siloxane resin and an ethanolamine in a volatile solvent, which resin has a degree of substitution of between 0.5 and 1.4 organo groups per silicon atom, said solution containing less than 5% of ethanolamine based on the siloxane resin present, drying the impregnated fabric partially curing the siloxane resin, laminating the fabric so prepared, and further curing the laminated assembly under mechanical pressure on the surfaces of the sheet, whereby substantial loss of resin from the fabric is avoided.

7. The method of making a thermo-setting sheet material which comprises impregnating an inorganic fibrous sheet material with a solution of a partially condensed siloxane resin and an ethanolamine in a volatile solvent, drying the sheet material, and partially curing the siloxane resin in the sheet material.

8. A sheet material comprising an inorganic fibrous sheet material impregnated with a partially condensed siloxane resin and an ethanolamine.

9. A sheet material comprising an inorganic fibrous sheet material, the fibers of which are coated with a partially condensed siloxane resin containing an ethanolamine.

10. A laminated material which comprises laminae of inorganic fibrous sheet material bonded together and with the voids thereof substantially filled by a siloxane resin which has been cured from the partially condensed state in the presence of an ethanolamine.

WILLIAM W. PEDERSEN.

REFERENCES CITED

The following references are of record in the file of this patent:

UNITED STATES PATENTS

| Number | Name | Date |
|---|---|---|
| 2,128,097 | Mains | Aug. 23, 1938 |
| 2,258,218 | Rochow | Oct. 7, 1941 |
| 2,265,962 | Bent et al. | Dec. 9, 1941 |
| 2,371,068 | Rochow | Mar. 6, 1945 |
| 2,389,807 | McGregor et al. | Nov. 27, 1945 |
| 2,435,147 | McGregor | Jan. 27, 1948 |